Patented Mar. 24, 1925.

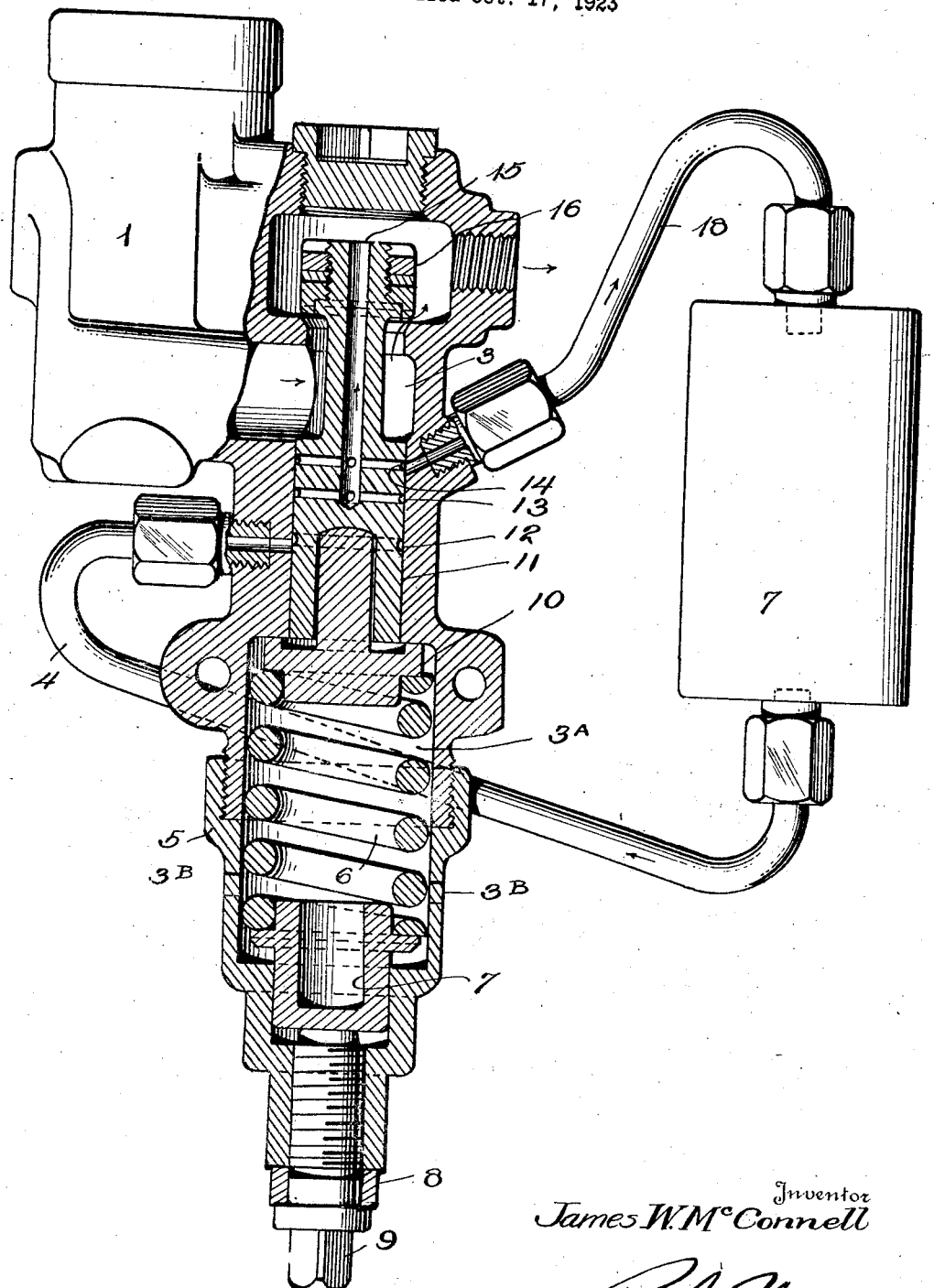

1,530,900

UNITED STATES PATENT OFFICE.

JAMES W. McCONNELL, OF NEWPORT, RHODE ISLAND, ASSIGNOR TO THE GOVERNMENT OF THE UNITED STATES, REPRESENTED BY THE SECRETARY OF THE NAVY.

TORPEDO.

Application filed October 17, 1923. Serial No. 669,008.

*To all whom it may concern:*

Be it known that I, JAMES W. McCONNELL, a citizen of the United States, residing at Newport, Rhode Island, have invented new and useful Improvements in Torpedoes, of which the following is a specification.

This invention relates to improvements in reducing valves and more particularly to the reducing and pressure regulating valve associated with automobile torpedoes.

As is well known to those familiar with the art, compressed air under high pressure is carried in the air flask of a torpedo and is fed by means of a regulator at reduced and uniform pressure to the combustion flask, where it is combined and used for driving the power unit.

One of the objects of the present invention is to provide a pressure reducing and regulating valve particularly adapted for use in torpedoes which will be substantially frictionless in operation and prevent a waste of air.

A further object is to provide a simple and practical regulating and reducing valve of the above character which may be inexpensively manufactured, assembled and installed.

Further objects are in part obvious and in part hereinafter pointed out in connection with the following description of the invention as indicated in the attached sheet of drawings forming a part of this disclosure.

In this drawing is shown in longitudinal section such parts of the complete valve and associated parts as are necessary to understand the invention.

Referring to the drawing in detail,

The figure indicates a valve body provided with a regulated air pressure outlet chamber 2 and outlet passage 2ᴬ; a high air pressure inlet chamber 3 and a neutral pressure chamber 3ᴬ open to the atmosphere or other pressure media in which valve may operate through holes 3ᴮ. This chamber is formed in part by valve body 1 and completed by spring case 5 and encloses a compression spring 6, one end of which abuts a fixed spring thrust collar 7 which may be adjusted by varying the thickness of collar 8 in conjunction with pressure adjusting screw 9. The opposite end of spring 6 engages a spring thrust stem 10 which transmits the spring compression pressure to the neutral pressure end of valve stem 11. Valve stem 11 separates the neutral pressure chamber 3ᴬ from the high pressure chamber 3 and opposite the neutral pressure end has a head 16 which separates the regulated pressure chamber from the high pressure chamber. The valve stem is provided with an annular oil groove 12 adjacent to the neutral pressure end and a final air leak off port 13 between the oil groove and the high pressure chamber and also a differential air leak off port 14 between the final air leak off port and the high pressure chamber. These ports are annular grooves connected by holes with air leak off passage 15 in the center and extending longitudinally of the stem and discharging into the regulated pressure chamber. Adjacent to the valve there is provided an oil bottle or closed receptacle 7 having an air inlet connection, pipe 18, at the top and an oil outlet connection, pipe 4, at the bottom. Pipe 18 leads to the valve body with its end substantially opposite the differential air leak off port 14 and pipe 4 leads to the valve body with its end substantially opposite the oil groove 12 at all operating positions of valve stem.

In operation air is received in inlet passage 3 from an otherwise closed container at a diminishing pressure. This air passes from inlet chamber 3 through the regulated opening around the valve head 16 into outlet chamber 2 and thence to torpedo power unit. A substantially uniform pressure is maintained in outlet chamber 2 by the effect of this pressure acting on the head of valve 16, opposed and balanced by the neutral pressure in chamber 3ᴬ acting on stem 11, plus the thrust on spring 6 communicated by stem 10 to stem 11 which regulates the opening under head of valve and consequently the volume of air passing from the inlet to the outlet chamber. The parts are so proportioned that the closing effect of inlet pressure, acting on stem 11, is balanced by the opening effect of inlet pressure acting on valve head 16.

Stem 11 has of necessity a sliding fit in valve body 1. It does not entirely close inlet chamber 3 from neutral chamber 3ᴬ and in consequence inlet air flows within the clearance spaces into regions of lower pressure. This flow or leak off is prevented from reaching the neutral pressure chamber 3ᴬ by the combined action of the differential air leak off port 14, the final air leak off port 13 and the oil groove 12. Inlet air flows from chamber 3 into the differential leak off port where it divides; the major part flows into the leak off passage and the remaining air flows into the final leak off port and thence into the leak off passage which returns all the leak off air to the outlet pressure chamber 2. The volume of air flowing from inlet chamber into the air leak off ports 13—14 is proportional to the inlet pressure, to the clearance of stem 11 and to the length of the space between these ports and the inlet pressure chamber 3. The air ports are proportioned to this volume which diminishes with the inlet pressure, so that the differential air leak off port 14 maintains a selected range of higher pressures than the regulated or outlet pressure maintained in the final air leak off port 13.

This differential pressure is led by pipe 18 to the top of oil bottle 17 and the resultant oil pressure is led through pipe 4 substantially opposite the oil groove 12 in stem 11. Oil therefore fills the clearance space around stem 11 and flows into regions of lower pressure, viz: into final air leak off port 13 and neutral pressure chamber 3ᴬ. Air leak off around stem 11 is therefore positively checked at air port 13 which is the function of the novel construction. The use of heavy oil combined with small clearances required result in very low oil consumption so that the quantity of oil used and its effects are negligible.

It will thus be seen that the present invention provides a simple and practical air reducing valve, particularly adapted for the purpose herein set forth and a distinct improvement over the use of diaphragms or packing or other perishable means for preventing waste of air. The movable sliding parts being mounted in oil renders the device substantially frictionless in operation.

What I claim is:—

1. In a valve of the character described, comprising a valve body, an inlet chamber, an outlet chamber, a neutral chamber, a neutral pressure chamber, a valve, a valve head separating said inlet and outlet chambers, a valve stem closing said inlet and said neutral pressure chambers except for necessary clearance, said stem and head proportioned to balance inlet pressure forces, a spring in compression opposing outlet pressure forces acting on said valve head, arranged to maintain a uniform outlet pressure in combination with a differential air leak off port on said stem adjacent to the inlet chamber, a final air leak off port on said stem adjacent the said differential port, an axial leak off passage in said stem communicating with said ports and leading to the outlet chamber, an annular oil groove on said stem between said final air leak off port and said neutral pressure chamber, an oil receptacle, an air pressure pipe whose inlet is in said valve body substantially opposite the said air differential leak off port and whose outlet is in the top of said oil receptacle, an oil pressure pipe whose inlet is in the bottom of said oil receptacle, and whose outlet is in said valve body substantially opposite said oil groove, said ports, oil receptacle and piping being adapted to establish necessary pressure and transfer oil into said oil groove, and thence around said valve stem at a higher pressure than exists in the final air leak off port, thus filling all space between said final leak off port and the neutral pressure chamber around said valve stem with oil and preventing air flow and air waste passing from said inlet chamber into said neutral pressure chamber.

2. In a valve as defined in claim 1, a floating spring thrust member axially projected into the said slidable stem and arranged to deliver the spring thrust in the axial and longitudinal center of said stem.

Signed at Newport, Rhode Island, this 23rd day of August, 1923.

JAMES W. McCONNELL.